Jan. 31, 1933.    L. R. MOCKBEE    1,895,857

PERCOLATOR

Filed Sept. 16, 1931

INVENTOR
Louis R. Mockbee
by
Arthur B. Jenkins
ATTORNEY

Patented Jan. 31, 1933

1,895,857

UNITED STATES PATENT OFFICE

LOUIS R. MOCKBEE, OF HARTFORD, CONNECTICUT

PERCOLATOR

Application filed September 16, 1931. Serial No. 563,110.

My invention relates more particularly to that class of coffee pots or similar vessels in which liquid is permitted to seep through the coffee or other material into the pot or vessel, and an object of my invention, among others, is to provide a coffee pot of this type in which the results produced shall be of a highly efficient character.

One form of a percolator embodying my invention and in the construction and use of which the objects herein set out, as well as others, may be attained is illustrated in the accompanying drawing, in which—

Figure 1:
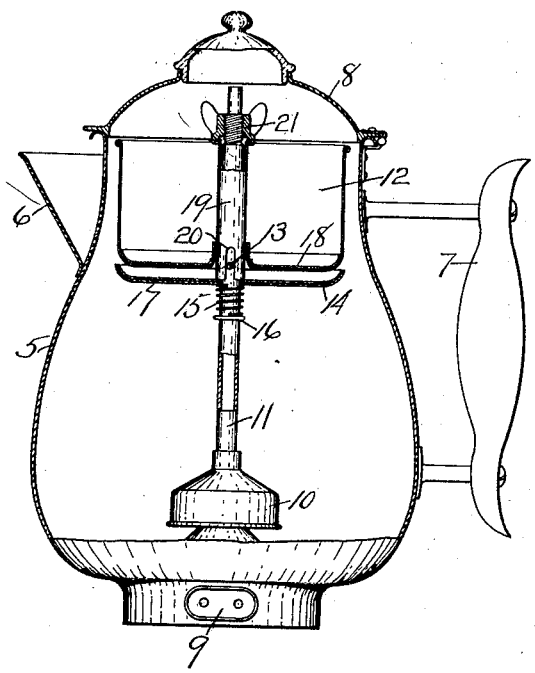
Figure 1 is a view in central vertical section through a percolator embodying my invention.
Figure 2:
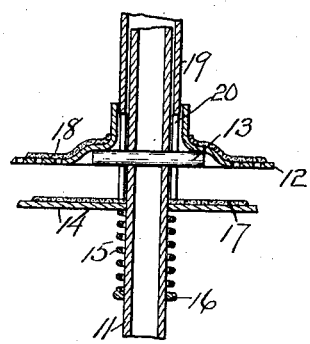
Figure 2 is a view, scale enlarged, illustrating the means for supporting the basket within the pot.

In the accompanying drawing the numeral 5 denotes a vessel or pot that may be of any usual construction having a spout 6 and a handle 7. A cover 8 of any ordinary form and construction is applied to the top of the pot, either by hinging or otherwise. Heat may be applied to the pot in any ordinary manner, a socket piece 9 for the attachment of an electric fixture being shown herein for this purpose.

A fountain chamber 10 rests near the bottom of the pot and a fountain tube 11 rises from the chamber to a point within the dome shaped cover 8. Liquid being placed in the pot 5 to cover the chamber 10, pressure is created in said chamber by means of heat which causes the liquid to be forced out of the upper end of the tube 11 in a manner that will be readily understood, the liquid flowing into the coffee or other material disposed in a basket 12 through which the tube 11 extends, said tube serving to support the basket in a position at the upper end of the pot. A pin 13 projecting through the tube serves as a means for support for the basket.

In carrying my invention into effect I provide a valve 14 which rests upon a spring 15 surrounding the tube 11 and supported by a flange 16 on said tube. The valve is lined with a packing 17 of any suitable material, the spring 15 thrusting the valve against the perforated bottom of the basket 12 to retain liquid within the basket when the valve is in this position. The bottom of the basket 12 is lined with a filter 18 of any suitable material that will permit liquid within the basket to filter through the bottom of the basket.

A valve actuating sleeve 19 is slidably mounted upon the tube 11, said sleeve having a slot 20 through which the pin 13 extends to permit sliding movement of the sleeve. The sleeve is swivelly connected at its upper end to a valve actuating nut 21 threadedly engaged with the upper end of the tube 11, said sleeve being engaged at its lower end with the valve 14.

In operation coffee or similar material having been placed in the basket 12, with a proper amount of water in the pot 5, the thumb nut 21 is turned to permit the spring 15 to force the valve 14 against the bottom of the basket 12. Heat now being applied to the pot the liquid is forced, in a manner that will be readily understood, through the tube 11, flowing out of the top and into the basket 12 where it is retained by the valve 14. The liquid being retained within the basket the contents thereof are permitted to steep for a certain length of time. The thumb nut 21 now being turned the valve 14 is forced away from the bottom of the basket and the liquid within the basket is permitted to filter through the bottom of the basket into the pot. The liquid may then be poured from the pot in the ordinary manner.

The operation above described may be repeated if desired to any extent.

It will be understood that the drawing herein is merely illustrative of the means for operating the percolator. As stated above, the proper amount of water in the pot 5 will be placed therein, and, as in the illustration the pot 5 is shown of greater capacity than the basket 12, it will be understood that only enough water to fill the basket will be placed in the pot. However, it is competent to place more water in the pot if desired, and by watching the process the operation may be determined as soon as the basket 12 is filled with water merely by disconnecting the electric plug.

It will be obvious that if desired the capacity of the basket 12 may be made to conform to that of the pot 5.

I claim:

1. A percolator including a vessel, percolating means including a percolating tube located within the vessel, a perforated receptacle supported by said tube, a valve to close the perforations in the receptacle, and means accessible from without the pot when said receptacle is in place for operating said valve.

2. A percolator including a vessel, percolating means including a percolating tube located within the vessel, a receptacle having a perforated bottom supported by said tube, a valve to close the perforations in the bottom of the receptacle, and means accessible from without the pot when said receptacle is in place for operating said valve.

3. A percolator including a vessel, percolating means including a percolating tube located within the vessel, a receptacle having a perforated bottom supported by said tube, which tube rises through said receptacle, a valve slidably mounted on said tube to close the perforations in the receptacle, and means accessible from without the pot when said receptacle is in place for operating the valve.

4. A percolator including a vessel, means including a percolating tube located within the vessel, a receptacle having a perforated bottom supported by said tube, a valve slidably mounted on the tube to close the perforations in the bottom of the receptacle, a spring to force said valve to its seat, and means for moving the valve away from its seat.

5. A percolator including a vessel, percolating means including a percolating tube located within the vessel, a receptacle having a perforated bottom supported by said tube, a valve slidably mounted on the tube to close said perforations in the receptacle, and means accessible at the mouth of said receptacle for operating said valve.

6. A percolator including a vessel, percolating means including a percolating tube located within the vessel, a receptacle having a perforated bottom supported by said tube, a valve to close the perforations in said bottom, a sleeve slidably mounted on said tube and secured to said valve, and means located at the mouth of the receptacle for operating said sleeve.

7. A percolator including a vessel, percolating means including a percolating tube located within the vessel, a receptacle having a perforated bottom supported on said tube, a sleeve projecting through said receptacle and slidably mounted on the tube, a valve secured to the lower end of the sleeve to close the perforations in said receptacle, a thumb nut screw threadedly engaged with the tube, and means for swivelly connecting said thumb nut to said sleeve for operation of said valve.

LOUIS R. MOCKBEE.